3,139,360
Patented June 30, 1964

3,139,360
INSPECTABLE SOLDERING FLUX COMPOSITION
George Voida, Albuquerque, N. Mex., assignor, by mesne assignments, to the United States of America as represented by the United States Atomic Energy Commission
No Drawing. Filed Dec. 28, 1960, Ser. No. 79,089
4 Claims. (Cl. 148—23)

This invention relates generally to the art or technique of soldering, that is, the use of a melted metal alloy in joining metal parts or surfaces together. It is more particularly concerned with a novel soldering flux composition whose presence is detectable in trace amounts in the presence of ultraviolet light.

A typical soldering flux may consist of a so-called fluxing agent, an activator, a wetting agent, and a solvent for homogeneous dispersal of these ingredients. The particular formulation will depend upon the manner in which the flux is to be used. Such a flux may be incorporated in solid form within a "cored" solder or it may be applied in advance to the surfaces to be soldered. In general the purpose of this flux is to remove oxides or other contaminants from metal surfaces to be subsequently joined by soldering. The flux accomplishes this by dissolution or chemical degradation of the oxide film or by chemical reactivity with the undesirable surface materials. In this manner a cleaner surface is produced, which enables the solder to more thoroughly and more uniformly "wet" the surfaces to be joined and thus achieve a higher degree of electrical conductivity.

In many applications it is absolutely essential to remove all traces of flux from soldered surfaces if subsequent electrical failures are to be prevented. For example, if the high insulation resistance and/or high dielectric strength of a printed circuit board are to be maintained, fluxing agents must be removed. This is not because the flux itself has sufficient electrical conductivity to in any way impair the electrical properties of the equipment on which it is found. On the contrary, it normally has a very high insulation resistance. However, under various environmental conditions such as the presence of solvents, solvent vapors or elevated temperatures, this residual flux will soften and in such condition may pick up dust or other conductive contaminants such as fingerprints or the like which will reduce the insulation resistance of the flux to a noticeable extent.

There are other reasons why it may be desirable to remove residual soldering flux. For example, if a printed circuit assembly is plastically encased for environmental protection, the residual flux must be completely removed if the encapsulating compound is to adhere satisfactorily. Also, electrically sealed components such as relays and switches require chemical cleanliness of their interior if outgassing problems are to be eliminated.

Unfortunately, traces of residual flux are extremely difficult to remove and hard to detect particularly since flux tends to creep away from a soldered juncture by capillary action. Operations rendering such soldered junctures and the surrounding areas apparently clean have proved ineffective in preventing contamination. With present visual inspection techniques this contamination passes unnoticed. It occurred to me that if these trace amounts of flux were made highly conspicuous in the presence of ultraviolet light a solution to this problem would be provided.

It is, therefore, a general object of this invention to provide a novel soldering flux composition which is inspectable in trace amounts in the presence of ultraviolet light.

I have observed that fluxing agents such as, for example, abietic acid in a rosin or resin type of flux have a natural fluorescence of their own. However, not only is this natural fluorescence lacking in intensity but it is effectively masked by the presence of other materials such as the solder itself or, in the case of laminates, by the epoxy resin. Also, some of the base materials to be soldered contain organic constituents which themselves demonstrate a marked degree of fluorescence rendering undetectable the trace amounts of flux. The natural fluorescence of a fluxing agent or any other normal flux constituent has, therefore, to my knowledge, never been used for optical inspection of trace amounts of flux under ultraviolet light.

I therefore concluded that it would be necessary to incorporate within the soldering flux an additive material whose presence would be readily apparent under ultraviolet light. I have not found reference in the literature on this subject to the use of an ultraviolet absorbing material for such purpose.

In investigating the problem of modifying conventional soldering fluxes to render them inspectable I concluded that an ultraviolet absorbing additive must have certain characteristics in addition to this inherent light-sensitive property. First, the material must display thermal stability, i.e., it must withstand or resist heat degradation or decomposition over the range of temperatures to be experienced in the soldering operation, which varies with the type of solder. With soft solders, for example, the melting point ranges from around 100 to about 500° F. It is possible in the literature to find many organic compounds suitable as ultraviolet absorbing agents which are thermally stable up to temperatures in the range of 700 to 800 degrees. Some of such materials will be mentioned below. Secondly, a desirable additive should be chemically stable, i.e., the material should not decompose in solvents used as carrying agents for the other flux constituents as well as for the ultraviolet absorber, nor should it be chemically degraded or changed by the other flux constituents. A third necessary quality is the ability of the ultraviolet absorbing additive to achieve homogeneous dispersal throughout the flux and to retain this dispersed state within the flux after the conclusion of the soldering operation. A fourth desirable quality is that the ultraviolet absorbing additive be able to absorb ultraviolet light between 2500 and 3600 Angstroms, since many of the lights designed for ultraviolet inspection are produced with capabilities within the cited wave length range. We might add a fifth important characteristic of a successful additive. It should not interfere with the normal fluxing action, that is, the removal by one means or another of the surface oxides or other conductive contaminants referred to above.

Another object of this invention is thus to provide a modified soldering flux composition which incorporates an ultraviolet absorbing additive.

An additional object of this invention is to provide in a modified soldering flux composition an ultraviolet absorbing additive which is thermally and chemically stable in a normal soldering environment.

A further object of the invention is to provide in a modified soldering flux composition an ultraviolet absorbing additive which achieves and retains homogeneous dispersal throughout the soldering flux.

Additional objects will be readily apparent from the following description including specific embodiments of my invention.

Briefly, this invention consists therefore in the discovery that a readily inspectable soldering flux can be formulated by adding to a conventional flux composition consisting typically of fluxing agent, solvent, activator, and wetting agent, an additional material having prescribed ultraviolet light absorbing qualities, such material being thermally stable over the temperature range of the soldering environment, exhibiting chemical stability in the presence of the fluxing solvent, being capable of achieving and retaining homogeneous dispersal throughout the soldering flux, and having no deleterious effect on the basic fluxing action.

I have discovered a number of materials which meet the above enumerated qualifications, in particular, 2-naphthylamine sulfonic acid, 3-aminonaphthylamide and 3-naphthoxanthene derivative of 2,8-dimethylceroxene oxide. In addition the following types of compounds are generally suitable as an ultraviolet absorbing flux additive: naphthylamine, benzophenone derivatives, stilbene derivatives, aldazine derivatives, acridine derivatives, acridone derivatives, xanthone derivatives, xanthione derivatives, benzofuran derivatives, polyester derivatives, and stearate, linoleate, ricinoleate and palmitate derivatives.

The following specific formulations are illustrative of the compositions of the present invention, but it is to be understood that the invention is not to be limited to the details thereof:

*Example 1*

| | |
|---|---|
| Solvent (isopropyl alcohol) | 280 fl. oz. |
| Fluxing agent (abietic acid) | 140 oz. av. |
| Ultraviolet absorber | 1 oz. av. |

*Example 2*

| | |
|---|---|
| Solvent | 300 fl. oz. |
| Fluxing agent | 150 oz. av. |
| Activator | 3 fl. oz. |
| Ultravoilet absorber | 1 oz. av. |

*Example 3*

| | |
|---|---|
| Solvent | 280 fl. oz. |
| Fluxing agent | 150 oz. av. |
| Activator | 3 fl. oz. |
| Wetting agent | 1 oz. av. |
| Ultraviolet absorber | 1 oz. av. |

It is noted that in Example 1 the fluxing agent is abietic acid or water white rosin. This constitutes a so-called rosin or resin-type of flux. By changing the fluxing agent we can change the basic type of flux, for example, to a chloride or "acid" flux, an organic type, or a wax or greese type. Compositions suitable as a solvent in this example include, in addition to isopropyl alcohol, other low molecular weight alcohols and low molecular weight acetates and alcohol-acetate and aqueous modifications.

The constituents of Example 2 may be the same as those in Example 1 with the inclusion of a so-called activator whose purpose is to assist in the cleansing of the surface prior to the flow of solder. The "activators" may be halogenated organic compounds such as naphthylamine hydrochloride, naphthalene hydrochloride, cetyl pyridinium bromide, ethyl dimethyl cetyl ammonium bromide or others. Additional non-halogenated activators may include acetamide, aniline, ethylenediamine, triethanolamine, stearic, levalinic and glutamic acids and others.

Finally, in Example 3, the other constituents are still present, and a so-called wetting agent is added whose purpose is again to accelerate the cleaning or contaminant removal from the surfaces to be joined and thus the subsequent distribution of the solder over the surfaces.

The precentage by weight of the flux constituents in the examples given as well as many others of similar nature may be varied within limits generally set forth in the following table:

| | Percent by weight |
|---|---|
| Ultraviolet absorber | 0.1–0.5 |
| Wetting agent | 0.1–0.5 |
| Activator | 0.5–1.0 |
| Rosin or resin | 25–40 |
| Solvent | 60–70 |

Note particularly that the amount of ultraviolet absorber may be about 0.1 to 0.5% by weight of the flux composition. Naturally it is important that a sufficient quantity of absorber be present to absorb the ultraviolet light used in the inspection process. However, consistent with this requirement the amount of the absorber should be limited, there being no advantage in having a quantity in excess of what may be conveniently detected with ultraviolet light. Furthermore, such excessive amounts might be disadvantageous particularly where the absorber is retained on a dielectric surface and interferes with electrical properties.

A number of possible variations in flux constituents have been detailed above. Conceivable combinations which involve obvious incompatabilities are of course not comprehended in this discussion and will be eliminated by skilled chemists. With this in mind, the flux compositions described may be readily prepared by first dissolving the ultraviolet absorber in the solvent. Next the activators and wetting agents should likewise be dissolved and, finally, the abietic acid or other fluxing agent should be dissolved. For this purpose the solvent need not be heated since the dissolution of the ultraviolet absorber and the abietic acid will readily occur in isopropyl alcohol and other suitable solvents to about 60 to 100° F.

The physical state of the modified soldering flux will depend on the manner in which the soldering is to be performed. If the flux is to be sprayed, brushed, rollercoated or applied by dipping, then a solvent will be present. With these methods either the parts to be soldered or the solder itself could be covered with the flux. In some applications it would be satisfactory to conduct a soldering operation immediately upon application of the flux while under other circumstances the flux coated parts might be stored for an indefinite period of time prior to soldering since the flux coating prevents oxidation of the surfaces to be joined. If the flux is to be incorporated within a cored solder, the solvent vehicle in the flux will first be eliminated.

The types of solders employed with a flux modified in accordance with this invention must have a range of melting temperatures over which the ultraviolet absorbers are stable. For example, if a soft solder having a melting temperature range of 100 to 500° F. is required, the available materials would include bismuth solders, such as 40, Bi, 40 Pb, and 20 Sn or 52 Bi, 40 Pb, and 8 Cd; with lead solders, such as 63 Pb and 37 Sn, or 92 Pb and 8 Cd; with mercury amalgams, such as 80 Hg and 20 Bi or 70 Hg and 30 Cu; with silver solders, such as 95 Pb and 5 Ag or 97.5 Pb and 2.5 Ag; with tin solders, such as 78 Sn, 9 Al, 8 Zn, and 5 Cd or 69 Sn, 26 Zn, 2.4 Al, and 2.4 P; with zinc solders, such as 75 Zn, 20 Cd, and 5 Al or 90 Zn, 6 Al and 4 Cu; and with indium solders, such as 25 In, 37.5 Pb and Sn 37.5; and perhaps copper and gold solders.

I find that with flux compositions prepared in accordance with the teaching of this invention, one can easily detect the presence of such flux in trace amounts following a soldering operation, thus faciliating the complete removal of such flux to achieve soldering surfaces entirely free of contamination.

From the above description it should be apparent that I have described a new and useful soldering flux composition. I do not intend to limit myself to the details or examples of this invention as set forth above since many variations within the scope of such invention will occur to those skilled in the art.

What is claimed is:

1. An inspectable soldering flux composition consisting essentially of from 25 to 40% by weight of fluxing agent, 60 to 70% by weight of solvent, and 0.1 to 0.5% by weight of an ultraviolet absorbing material selected from the group consisting of 2-naphthylamine sulfonic acid, 3-aminonaphthylamide, and 3-naphthoxanthene derivative of 2,8-dimethylceroxene oxide.

2. An inspectable soldering flux composition as in claim 1 wherein said ultraviolet absorbing material consists of 2-naphthylamine sulfonic acid.

3. An inspectable soldering flux composition as in claim 1 wherein said ultraviolet absorbing material consists of 3-aminonaphthylamide.

4. An inspectable soldering flux composition as in claim 1 wherein said ultraviolet absorbing material consists of 3-naphthoxanthene derivative of 2,8-dimethylceroxene oxide.

References Cited in the file of this patent

UNITED STATES PATENTS

| | | |
|---|---|---|
| 1,511,874 | Eder | Oct. 14, 1924 |
| 2,037,793 | Jacobson | Apr. 21, 1936 |
| 2,267,758 | Sell | Dec. 31, 1941 |
| 2,291,400 | Miller | July 28, 1942 |
| 2,664,371 | Snell et al. | Dec. 29, 1953 |
| 2,818,432 | Kirby | Dec. 31, 1957 |
| 2,852,503 | Long et al. | Sept. 16, 1958 |

FOREIGN PATENTS

| | | |
|---|---|---|
| 684,081 | Great Britain | Dec. 10, 1952 |

OTHER REFERENCES

Friedel et al.: Ultraviolet Spectra of Aromatic Compounds, 1951, figures (spectral charts) 83, 264–265, 398–400, 407, and 563.